Patented Feb. 20, 1940

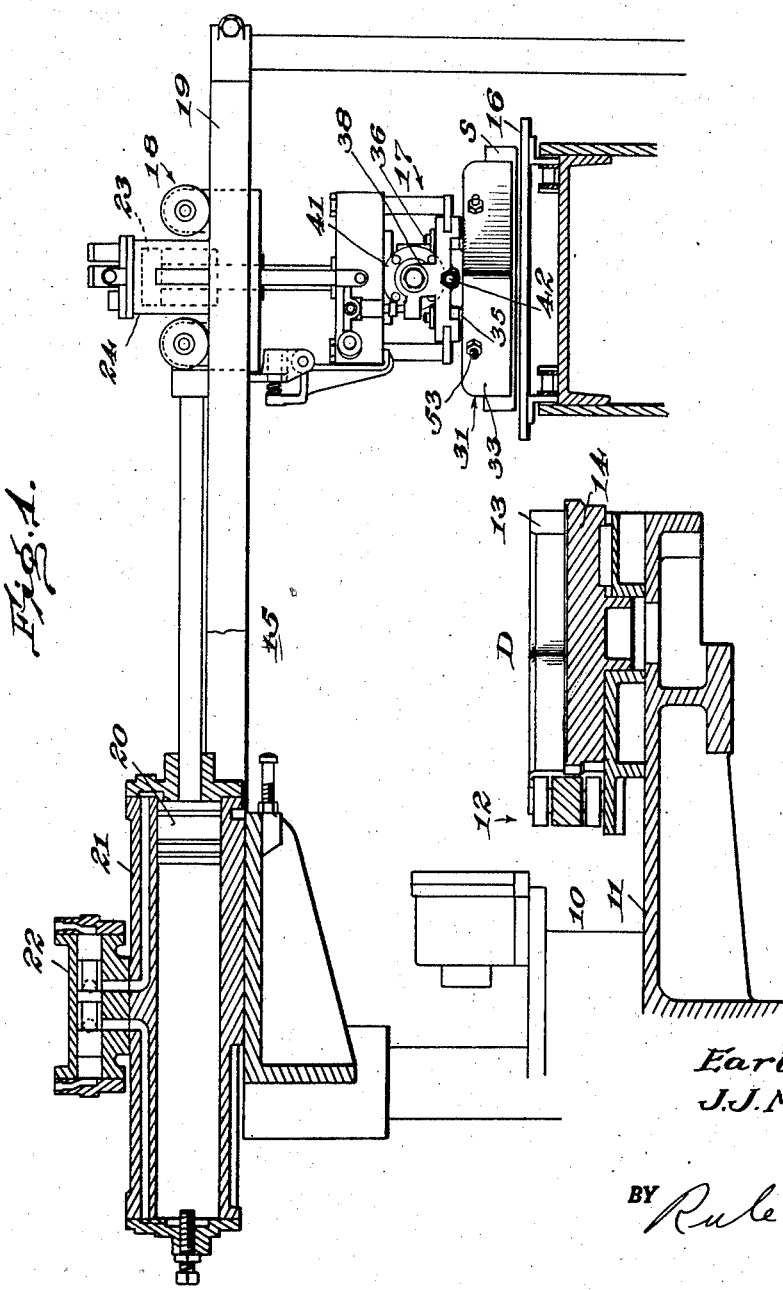

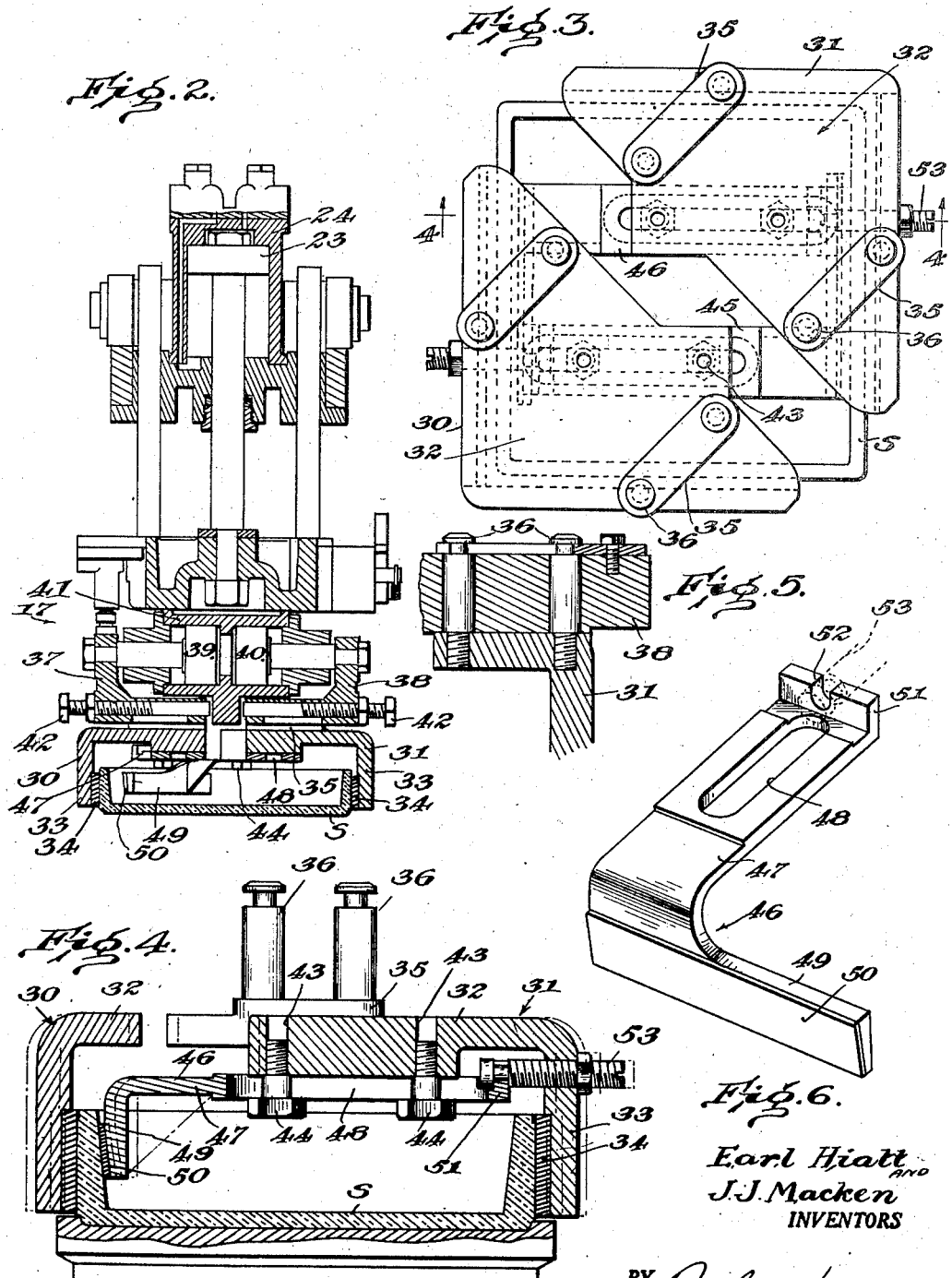

2,191,143

UNITED STATES PATENT OFFICE 2,191,143

GLASS HANDLING APPARATUS

Earl Hiatt and John J. Macken, Muncie, Ind., assignors to Owens-Illinois Glass Company, a corporation of Ohio Application February 3, 1939, Serial No. 254,450

6 Claims. (Cl. 294—88)

The present invention relates to glass handling apparatus and more particularly to a jaw structure designed for use in connection with automatic take-out machines for removing cup-like articles, as for example half-sections of a glass building block, from the molds in which they are formed and for transferring them to and placing them on a traveling conveyor.

Heretofore, in the handling of such block sections, particularly in removing the hot semi-plastic sections from the forming molds, utilization has been made of a pair of separable jaw members which descend upon an upwardly facing cup-shaped block section in the mold and close upon the section from opposite sides thereof to engage the opposite parallel block sides. Because of the fact that for proper handling of the block sections considerable pressure must be exerted on the block section sides by the jaws and because the glass material of the section is not fully hardened, deformation of the block almost invariably results. Such deformation of the section is usually in the form of a caving in or bending in of the sides which are engaged by the jaws with the ultimate result that subsequently in assembling a pair of sections upon each other to produce a completed block, registration of the meeting edges of the block is imperfect.

The present invention is designed to overcome the above noted limitations that are attendant upon this type of handling apparatus in that means is provided for bracing the inner walls of the block section sides against the inward pressure brought to bear through the block sides from the outer walls thereof by the pressing action of the jaw members. The net result of accomplishing this is to nullify the opposed pressing action of the outer jaws which engage the outer walls of the block section and to provide a double jaw action wherein the opposite sides of the block section are engaged independently and pressure is applied thereto both from within and without to produce the necessary stripping and lifting action required in the handling of the section.

This being the principal object of the invention, it is another object thereof to provide a jaw structure for such handling apparatus which is relatively simple in construction; one which is rugged and durable and comprised of a minimum number of moving parts and which therefore is unlikely to get out of order; one which is adjustable to accommodate block sections of varying proportions; one which may be incorporated in existing jaw constructions without substantial modification thereof; and one which requires no modification of the original handling apparatus to which it is applied.

Other objects of the invention, not at this time enumerated, will become readily apparent as the nature of the invention is better understood.

In the accompanying drawings:

Fig. 1 is a side elevational view, partly in section, of a handling apparatus to which the improved jaw structure has been applied.

Fig. 2 is a fragmentary vertical sectional view taken through the jaw structure showing the same applied to a block half-section.

Fig. 3 is a top plan view of the jaw structure per se.

Fig. 4 is a sectional view taken substantially along the line 4—4 of Fig. 3.

Fig. 5 is a fragmentary sectional view taken through one of the attaching means by which the jaw construction is suspended from the jaw supports of the handling apparatus, and Fig. 6 is an enlarged perspective view of an inner jaw member employed in connection with the present invention.

Referring now to Fig. 1, a fragment of a conventional type of rotary glass block forming machine is shown at 10 and includes a rotary mold table 11 on which there is mounted an annular series of mold groups 12 including partible mold sections 13 and a bottom plate 14 therefor. The mold table 11 is adapted to periodically be indexed to bring the mold groups in succession through the various operating stations and finally to a discharge station D whereupon the mold sections 13 become opened and the handling or take-out apparatus 15 is adapted to transfer the block sections S or other flat sided ware to a traveling conveyor 16.

Briefly, the handling or take-out apparatus comprises a combined gripping and lifting device 17 which is suspended from a carrier or crane 18 that travels horizontally on a track 19 and is moved back and forth by means of a piston 20 in a cylinder 21 mounted on the machine. A valve mechanism 22 controls the movements of the piston 20 in timed relation to the arrival of the mold groups 13 at the discharge station D. The gripping and lifting device 17 is adapted to be moved vertically by means of a piston 23 disposed in a cylinder 24 associated with the carrier 18.

The gripping and lifting device 17 is adapted to descend upon a block half-section S supported on the bottom plate 14, engage the same and, by a bodily movement vertically, elevate the section from the bottom plate. The carrier 18 then moves laterally to move the gripping and lifting device 17 to a position over the conveyor 16 whereupon the device 17 moves downwardly, placing the block section S on the conveyor 16 and releasing the same.

The construction of the conveying mechanism including the carrier 18 and its actuating mechanism is more or less conventional as far as the present application is concerned, the novelty thereof residing rather in the specific construction of the gripping and lifting device 17 by means of which the block sections are handled without distortion as will be more fully described hereinafter.

Referring now to Figs. 2, 3 and 4, a pair of outer jaw members 30 and 31 each includes a triangular top plate 32 having formed thereon a depending side or jaw 33 provided with a facing 34 of resilient heat resisting material designed for engagement with an outer surface of the block section side wall. The top plate 32 of each jaw member has formed thereon a pair of upstanding bosses 35 carrying attachment pins 36 by means of which the jaw members 30 and 31 are removably suspended from a pair of jaw supports 37 and 38 respectively. Pistons 39 and 40 disposed in a cylinder 41 forming a part of the gripping and lifting device 17 are connected to the supports 37 and 38 and are adapted to be moved toward and away from each other at regular intervals to move the jaw members 30 and 31 toward and away from each other to engage the block sides therebetween or to release the same. Adjusting screws 42 permit shifting of the jaw members 30 and 31 with respect to their respective supports 37 and 38 to accommodate block sections of different sizes. The jaw structure just described together with its actuating mechanisms is conventional as far as this application is concerned and the limitations attendant thereon, namely the tendency of the two jaws 33 to distort the block section walls, has already been emphasized. The novelty of this application consists in the provision of auxiliary jaws adapted to engage the inside faces of the block section walls to brace the same against collapse as will now be fully described.

Referring now to Fig. 4, a pair of threaded apertures 43 are formed in the top plate 32 of each jaw member and each aperture receives therein a stud 44. The studs 44 serve to slidably support an inner jaw member, one of which is shown at 45 and another at 46, which is formed with a top portion 47 having a slot 48 therein through which the studs extend and a depending side or jaw 49 provided with a resilient heat resisting facing 50. An end of the top portion 47 is turned upwardly as at 51 and the turned up portion is formed with a slot 52 therein designed for interlocking engagement with one end of a slotted threaded adjusting screw 53 which extends through the side or jaw 33 of the jaw member 30 or 31 as the case may be. The inner jaws 49 occupy positions directly opposed to the outer jaws 33 and are adapted to engage the inner sides of the block section side walls. Turning of the adjusting screws 53 in one direction or the other effects adjustment of the jaws 49 relative to the jaws 33 to accommodate block sections having side walls of different thicknesses.

In the operation of the jaw structure, when the gripping and lifting device 17 descends upon a block half-section S supported on the bottom plate 14, the pairs of jaws 49 and 33 straddle the opposed upstanding side walls of the section and, when air is admitted to the outer ends of the cylinder 41 to move the pistons 39 and 40 inwardly toward each other, the outer jaws 33 are moved inwardly against the outer faces of the block section side walls. Simultaneously, the jaw 49 which is supported from each jaw member 30 or 31 moves into engagement with the inner face of the block section wall which it opposes and serves to brace the wall against the inward thrust of the opposing outer jaw 33. Thus, in effect, the opposed pressing or gripping action of the outer jaws 33 on the outer sides of the block section is nullified and the walls of the section are held against collapse. The gripping action, instead of being limited to opposite outer faces of the block, occurs on the inside and outside of the block walls themselves and each wall is engaged between an inner jaw 49 and an outer jaw 33 which, in addition to preventing collapse of the block walls, provides a greater area of gripping contact and more efficient handling of the block sections.

After the block section has been thus gripped by the jaw structure, the gripping and lifting device 17 is elevated as previously described, is moved laterally to a position over the conveyor 16, is lowered and the block section released by separation of the inner and outer jaws 49 and 33 respectively as the pistons 39 and 40 are caused to move apart in the cylinder 41 in which they are housed.

Modifications may be resorted to within the spirit and scope of the appended claims.

We claim:

1. The combination with a pair of jaw supports movable toward and away from each other, of an outer jaw member including a jaw secured to each support and movable in unison therewith, and an inner jaw member including a jaw secured to each outer jaw member and movable in unison therewith, the jaw of each inner jaw member being in opposed gripping relation to the jaw of the outer jaw member to which the other inner jaw member is secured.

2. The combination with a pair of jaw supports movable toward and away from each other, of an outer jaw member including a jaw secured to each support and movable in unison therewith, an inner jaw member including a jaw secured to each outer jaw member and movable in unison therewith, the jaw of each inner jaw member being in opposed gripping relation to the jaw of the outer jaw member to which the other inner jaw member is secured, and means for adjusting the position of each inner jaw member relative to the outer jaw member to which it is secured.

3. The combination with a pair of jaw supports movable toward and away from each other, of an outer jaw member including a jaw secured to each support and movable in unison therewith, said jaws opposing each other and adapted to engage therebetween the opposite sides of a cup-shaped block section, and an inner jaw member including a jaw secured to each outer jaw member and movable therewith, the jaw of each inner jaw member being in opposed gripping relation to the jaw of the outer jaw member which the inner jaw member opposes and being adapted to engage an inner side of the block section, each of said jaws having secured thereto a heat resisting facing strip.

4. The combination with a pair of jaw supports movable toward and away from each other, of an outer jaw member including a jaw secured to each support and movable in unison therewith, an inner jaw member including a jaw secured to each outer jaw member and movable in unison therewith, the jaws on the inner jaw members opposing the jaws on the outer jaw members to provide two pairs of gripping jaws, and means for adjusting the position of each outer jaw member with respect to the jaw support to which it is secured.

5. The combination with a pair of jaw supports movable toward and away from each other, of an outer jaw member including a jaw secured to each support and movable in unison therewith, an inner jaw member including a jaw secured to each outer jaw member and movable in unison therewith, the jaws on the inner jaw members opposing the jaws on the outer jaw members to provide two pairs of gripping jaws, means for adjusting the position of each outer jaw member with respect to the jaw support to which it is secured, and means for adjusting the position of each inner jaw member relative to the outer jaw member to which it is secured.

6. A jaw structure comprising a pair of jaw members each having downwardly extending sides providing opposed outer jaws adapted respectively to engage therebetween the outside surfaces of a pair of opposite parallel walls of an upwardly facing cup-shaped half-section of a hollow glass building block, an inner jaw member slidably secured to each outer jaw member, said inner jaw members having downwardly extending sides providing inner jaws adapted respectively to engage the inside surfaces of said pair of parallel walls and brace the walls against the inward pressure of the outer jaws, and means for independently adjusting the position of each inner jaw member with respect to the outer jaw member to which it is secured.

EARL HIATT.
JOHN J. MACKEN.